US010918946B2

(12) United States Patent
Jarzebinski

(10) Patent No.: US 10,918,946 B2
(45) Date of Patent: Feb. 16, 2021

(54) IN-GAME INFORMATION PLATFORM

(71) Applicant: Sony Interactive Entertainment LLC, San Mateo, CA (US)

(72) Inventor: Alexander Jarzebinski, Garden Grove, CA (US)

(73) Assignee: Sony Interactive Entertainment LLC, San Mateo, CA (US)

( * ) Notice: Subject to any disclaimer, the term of this patent is extended or adjusted under 35 U.S.C. 154(b) by 102 days.

(21) Appl. No.: 16/181,328

(22) Filed: Nov. 5, 2018

(65) Prior Publication Data

US 2020/0139245 A1 May 7, 2020

(51) Int. Cl.
| | |
|---|---|
| A63F 13/533 | (2014.01) |
| A63F 13/67 | (2014.01) |
| A63F 13/798 | (2014.01) |
| A63F 13/352 | (2014.01) |

(52) U.S. Cl.
CPC .......... *A63F 13/533* (2014.09); *A63F 13/352* (2014.09); *A63F 13/67* (2014.09); *A63F 13/798* (2014.09); *A63F 2300/305* (2013.01); *A63F 2300/308* (2013.01); *A63F 2300/535* (2013.01); *A63F 2300/558* (2013.01); *A63F 2300/6027* (2013.01)

(58) Field of Classification Search
CPC ...... A63F 13/533; A63F 13/352; A63F 13/67; A63F 13/798; A63F 2300/305; A63F 2300/308; A63F 2300/535; A63F 2300/558; A63F 2300/6027
See application file for complete search history.

(56) References Cited

U.S. PATENT DOCUMENTS

| | | | |
|---|---|---|---|
| 2001/0016510 A1 | 8/2001 | Ishikawa et al. | .................. 463/7 |
| 2007/0072678 A1 | 3/2007 | Dagres | ............................ 463/42 |
| 2009/0094535 A1* | 4/2009 | Bromenshenkel | ....... A63F 13/10 |
| | | | 715/757 |
| 2012/0116550 A1 | 5/2012 | Hoffman et al. | ............... 700/91 |

(Continued)

FOREIGN PATENT DOCUMENTS

KR         101540448 B1      7/2015      ............. G06Q 50/10

OTHER PUBLICATIONS

PCT/US2019/058968 Annex to Form PCT/ISA/206, Communication Relating to the Results of the Partial International Search, European Patent Office, dated Jan. 24, 2020.

(Continued)

*Primary Examiner* — Omkar A Deodhar
(74) *Attorney, Agent, or Firm* — Penilla IP, APC

(57) ABSTRACT

Technology is described for surfacing in-game durational information to a player by way of a durational information platform. In a method embodiment, an operation processes a game data of a player for determining a game course the player is to take between a current state and a subsequent state within the game. The method also includes an operation for identifying a plurality of sequential segments within the game course for completion by the player and an operation for processing game telemetry of the player for determining effectiveness metrics of the player. The method further includes operations for calculating an estimated time for completion of the game course and for generating a recommendation for communication to a device of the player including the estimated time for completion.

23 Claims, 11 Drawing Sheets

(56) References Cited

U.S. PATENT DOCUMENTS

| | | |
|---|---|---|
| 2012/0128147 A1 | 5/2012 | Callanan et al. ........ 379/207.02 |
| 2012/0235814 A1 | 9/2012 | Callanan et al. ............. 340/540 |
| 2014/0228988 A1 | 8/2014 | Hoffman et al. ............... 700/91 |
| 2014/0256447 A1 | 9/2014 | Woodman et al. |
| 2015/0251053 A1 | 9/2015 | Hoffman et al. .. A63B 24/0003 |
| 2015/0258380 A1 | 9/2015 | Hoffman et al. .. A63B 24/0062 |
| 2016/0001181 A1 | 1/2016 | Marr et al. ............ A63F 13/795 |
| 2016/0001182 A1 | 1/2016 | Marr et al. ............ A63F 13/795 |
| 2016/0001183 A1 | 1/2016 | Harvey et al. ........ A63F 13/798 |
| 2016/0001186 A1 | 1/2016 | Marr et al. ............ A63F 13/847 |
| 2016/0005270 A1 | 1/2016 | Marr et al. ......... G07F 17/3255 |
| 2016/0089608 A1* | 3/2016 | Deng ................. G06Q 10/0637 463/29 |
| 2016/0107064 A1 | 4/2016 | Hoffman et al. .. A63B 71/0622 |
| 2016/0151712 A1 | 6/2016 | Woodman et al. ..... A63F 13/67 |
| 2016/0256775 A1 | 9/2016 | Gustafson et al. ... A63F 13/493 |
| 2017/0036064 A1 | 2/2017 | Hoffman et al. .. A63B 24/0003 |
| 2017/0056727 A1 | 3/2017 | Hoffman et al. .. A63B 24/0062 |
| 2017/0259177 A1* | 9/2017 | Aghdaie ................ G06N 7/005 |
| 2017/0274287 A1 | 9/2017 | Harvey et al. ........ A63F 13/798 |
| 2017/0333753 A1 | 11/2017 | Hoffman et al. .. A63B 24/0062 |
| 2018/0001205 A1* | 1/2018 | Osman ................ A63F 13/5375 |
| 2018/0001206 A1* | 1/2018 | Osman ................ A63F 13/5375 |
| 2018/0065047 A1 | 3/2018 | Marr et al. ............ A63F 13/795 |
| 2018/0093132 A1 | 4/2018 | Hoffman et al. .. A63B 24/0062 |
| 2018/0111022 A1 | 4/2018 | Hoffman et al. .. A63B 24/0062 |
| 2018/0243656 A1* | 8/2018 | Aghdaie ................. A63F 13/79 |
| 2019/0012734 A1 | 1/2019 | Cruttenden et al. ... G06Q 40/02 |
| 2019/0070513 A1 | 3/2019 | Harvey et al. ........ A63F 13/798 |
| 2019/0168119 A1 | 6/2019 | Gustafson et al. ... A63F 13/493 |
| 2019/0168122 A1 | 6/2019 | Osman et al. .......... A63F 13/67 |

OTHER PUBLICATIONS

PCT/US2019/058968 International Search, European Patent Office, dated Mar. 13, 2020.

* cited by examiner

Effectiveness Metrics _401_ — 500

| Type | Score | Corrective Action 1 | Corrective Action 2 | Corrective Action 3 | Corrective Action 4 |
|---|---|---|---|---|---|
| Hand-controller coordination | | | | | |
| Reaction speed | | | | | |

502

| Time | Game input action | Game Response | Predicted desired game response | Desired response | Desired game action input | Category of Action | Corrective action 1 | Corrective action 2 |
|---|---|---|---|---|---|---|---|---|
| 00:15 | | | | | | | | |

504

| Time | Game input action | Game Response | Predicted desired game response | Desired response | Desired game action input | Category of Action | Corrective action 1 | Corrective action 2 |
|---|---|---|---|---|---|---|---|---|
| 00:15 | | | | | | | | |

FIG. 5

IN-GAME INFORMATION PLATFORM

FIELD OF THE DISCLOSURE

The present disclosure relates generally to video games, and more particularly, to methods and systems for providing timing information such as estimated times for completion and bonus content to players.

BACKGROUND

In everyday life, people have a general idea of how long a task will take. Washing machines, for example, can display an estimated time that it will take to wash and dry your clothes. A global positioning system (GPS) component of an application will tell a driver how long it may take him or her to reach a destination. Similarly, in the realm of entertainment, users are often given an idea of how long something will take. For example, users are typically provided with an estimate of how long a download will take, or how long a commercial will run. Not so with video games. In many circumstances, players of video games are not made aware of how long a certain task will take. For example, when a player of a single player game attempts to complete a level of some sort, they may be required to take anywhere between less than five minutes and more than a several hours to complete the task. This uncertainty in the time required to complete an in-game task poses problems to players because they may have other engagements.

It is in this context that embodiments arise.

SUMMARY

Embodiments of the present disclosure relate to methods and systems for searching and identifying in-game resources that assist a player based on contextual data and data from a community of similar players.

In one embodiment, a computer-implemented method is provided. The method provides an operation for processing game data of a player of a video game for determining a game course the player is to take between a current state and a subsequent state within a video game. The method further includes an operation for identifying a plurality of segments that are sequential within the game course, each of the plurality of segments is completed by the player by inputting game action inputs to achieve corresponding game responses. The method includes an operation for processing, at the server, game telemetry of the player from prior segments of the video game for determining effectiveness metrics, the game telemetry includes game action inputs and the corresponding game responses. Moreover, the method includes an operation for calculating, using a game action function, an estimated time the player is to use to traverse the game course to reach the subsequent state based on the effectiveness metrics. Additionally, the method includes an operation for generating a recommendation for communication to a device of the player, the recommendation includes the estimated time for the player to reach the subsequent state.

In another embodiment, a server system is provided. The server system includes a game course analyzer for receiving game data of a player of a video game for predicting a game course the player is to take between a current state and a subsequent state within the video game. The server system includes a game course segmentation module for identifying a plurality of sequential segments that player is to complete by inputting game action inputs to achieve corresponding game responses. Further the server system includes a game play effectiveness module for processing game telemetry of the player of the player from prior segments of the video game for determining effectiveness metrics, the game telemetry includes game action inputs and corresponding game responses. Additionally, the server system includes a game action function module for predicting a duration for completion for the game course based on the plurality of segments of the game course and based on the effectiveness metrics. Further, the server system includes a recommendation module for communicating the duration for completion to a device of the player.

In yet another embodiment, a non-transitory computer-readable storage medium storing a computer program executable by a processor-based system is provided. The non-transitory computer-readable storage medium includes program instructions processing game data of a player of a video game for determining a game course the player is to take between a current state and a subsequent state within the video game. The non-transitory computer-readable storage medium also includes program instructions for identifying a plurality of segments that are sequential within the game course, each of the plurality of segments is to be completed by the player by inputting game action inputs to achieve corresponding game responses. Moreover, the non-transitory computer-readable storage medium includes program instructions for processing game telemetry of the player from prior segments of the video game for determining effectiveness metrics, the game telemetry includes game action inputs and the corresponding game responses. Additionally, the non-transitory computer-storage medium includes program instructions for calculating, using a game action function, an estimated time the player is to use to traverse the game course to reach the subsequent state based on the effectiveness metrics. Further, the non-transitory computer-readable storage medium includes program instructions for generating a recommendation for communication to a device of the player, the recommendation includes the estimated time for the player to reach the subsequent state. Other aspects of the disclosure will become apparent from the following detailed description, taken in conjunction with the accompanying drawings, illustrating by way of example the principles of the disclosure.

BRIEF DESCRIPTION OF THE DRAWINGS

The disclosure may best be understood by reference to the following description taken in conjunction with the accompanying drawings in which:

FIG. 5 illustrates certain elements of effectiveness metrics as generated and updated by the game play effectiveness module, according to one embodiment.

DETAILED DESCRIPTION

Figure 1A:
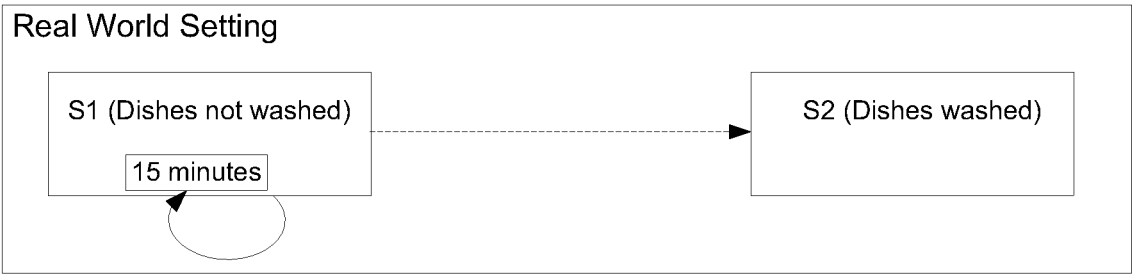
FIGS. 1A-1D show conceptual diagrams how durational information is identified and delivered or not to a user in various real-world and virtual settings, according to various embodiments.

Embodiments of the present disclosure relate to methods and systems for providing timing information to a player based on the player's game telemetry and effectiveness of gameplay. Embodiments of the present disclosure also relate to methods and systems for providing bonus content to players based on player preferences. It will be obvious, however, to one skilled in the art, that the present disclosure may be practiced without some or all of these specific details. In other instances, well known process operations have not been described in detail in order to not unnecessarily obscure the present disclosure.

People go about their everyday life with a sense of how long things take to complete. They make decisions to do or to forgo endeavors based on an estimation of how long those endeavor are likely to take. Having an estimation of time for completion for various tasks allows us to plan ahead, entertain multiple tasks at once, and make important decisions with our time. For example, when we drive to a destination, our GPS can tell us how much longer it will take to arrive. Or we can decide to not to go to the destination based on an estimated time it takes to get there. Thus, durational information for how long it takes to complete something or arrive somewhere enable us to make decisions surrounding our time.

The same is not necessarily true of video games. When a player attempts to complete a task (e.g., a level, a level-up, a mission, a chapter, obtaining an object, etc.), they may be completely unaware of the amount of time it may take. In certain circumstances, a player is not given the appropriate durational information necessary to make informed decisions with their time. For example, if a player does not have the requisite durational information, they may miss a show or game they were intending to tune into. In other circumstances, the player who does not have duration information may unwittingly play into the night and sacrifice sleep almost unintentionally due to their engagement in the game.

In some settings, video games have been known to distort a player's perception of time. That is, for example, when a player drives a virtual car at 100 miles an hour, or farms an area repeatedly, or engages in a long intense battle, it is difficult for that player to maintain a sense of time that correlates with real world time. As a result of certain inherent features of video games, players are often disconnected with a sense of real world time. If the player is provided with durational information on the tasks the player wishes to complete within the game, the player can make better and more informed decisions about whether to attempt the task or whether to momentarily forgo the task. Embodiments contemplated here are for a durational information platform that is configured to predict a virtual task that the player is attempting to complete, predict an amount of time that virtual task might take for the player to complete, and present the predicted time to the player. In some embodiments, actionable options are presented along with the durational information to help solve scheduling or timing issues associated with unknown durations that game-related tasks take.

FIGS. 1A-1D show conceptual diagrams how durational information are identified and delivered or not to a user in various real-world and virtual settings, according to various embodiments. FIG. 1A shows a user in a real-world setting in state S1 where the dishes are not washed. The user attempts to reach state S2 where the dishes are washed. In real world settings, such as that shown in FIG. 1A, we have a natural sense of how long tasks will take. This intuitive sense of duration can be subconscious, or it can be conscious, and can be applied to tasks that range from the mundane to more grandiose ones. For example, when we are tasked with chores such as doing the dishes, it does not take much thought to have a sense of how long getting the dishes done will take. We look at the amount of dishes, the state of the dishes, and whether the dish washer has been unloaded or not. We also know, based on experience, how fast or slow we are at washing dishes. From this data, we can gauge accurately how long the task will take. This type of "intuitive durational information" is more often available for routine and linear tasks such that an individual can scale their prediction of duration according to known quantities (e.g., number of dishes) and known durations (e.g., 15 seconds per dish).

Figure 1B:
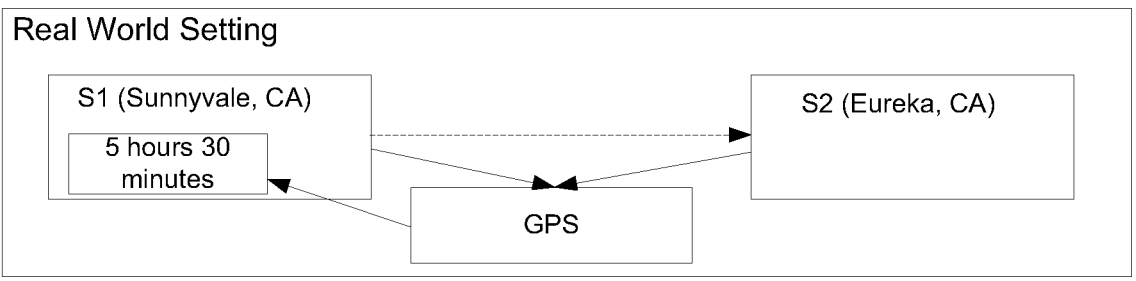

In other real world settings, users may augment their intuitive durational sense with outside data. In FIG. 1B, a user in state S1 is currently in Sunnyvale, Calif. and wanting to go to Eureka, Calif. (state S2). Here, the user's intuitive durational sense is less informative because the user may not know how far Eureka is from Sunnyvale and what the road conditions may be. A GPS application is useful in this setting to provide durational information on how long the drive will take. When the user is provided with durational information, they can make informed choices regarding the trip. They may, for example, decide to forgo the trip because it requires too long of a drive. They may, instead, plan a specific time of day in which to leave Sunnyvale for the trip, or they may plan to stay the night in Ukiah, Calif., since it is about half-way between Sunnyvale and Eureka. In any case, the user is given valuable, actionable durational information regarding the trip.

Figure 1C:

FIG. 1C shows a user in a virtual setting attempting to reach state S2, where a virtual task is complete, from state S1, where the virtual task is not complete, according to one embodiment. The virtual task may be any in-game related state change such as completing a stage, a level, a chapter, a mission, or obtaining an item, a character, a level-up, etc. As shown in FIG. 1C, the user in state S1 does not have any durational information on how long it will take to reach S2. The user may make a guess at the duration needed to complete the task, but often these guesses are not accurate. In any case, the duration for completion may be anywhere between 15 minutes to 150 minutes. In other words, the user's guess of the duration for completion may be off by an order of magnitude or more. This level uncertainty regarding time is typically not tolerated in everyday life. Yet in certain virtual settings it currently almost unavoidable. Embodiments described here are contemplated to reduce current levels of durational uncertainty associated with virtual settings such as video games by implementing durational information platforms. In some embodiments, the durational information platforms are enabled to predict or calculate an amount or a range of time that the user is likely to take to complete a given task in the virtual setting based on the user's effectiveness. In these embodiments, the amount of time or ranges of time that the user is likely to take may be referred to herein as duration for completion or estimated time for completion, or completion duration.

Figure 1D:
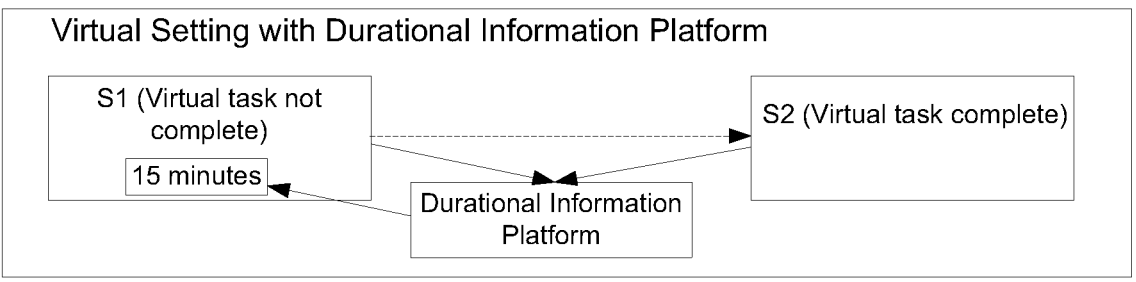

FIG. 1D shows a virtual setting with a durational information platform for providing a completion duration for completing a virtual task, according to one embodiment. The completion duration is shown to be 15 minutes, and can inform the user whether or not to initiate the task or not. Had the completion duration been 150 minutes instead, the user may decide to forgo the task for the moment, or decide to complete half of the task now and half of it at a later time. The user is thus given valuable and actionable durational information on the task he or she wishes to engage and can thereby make informed choices about the task.

Figure 2:
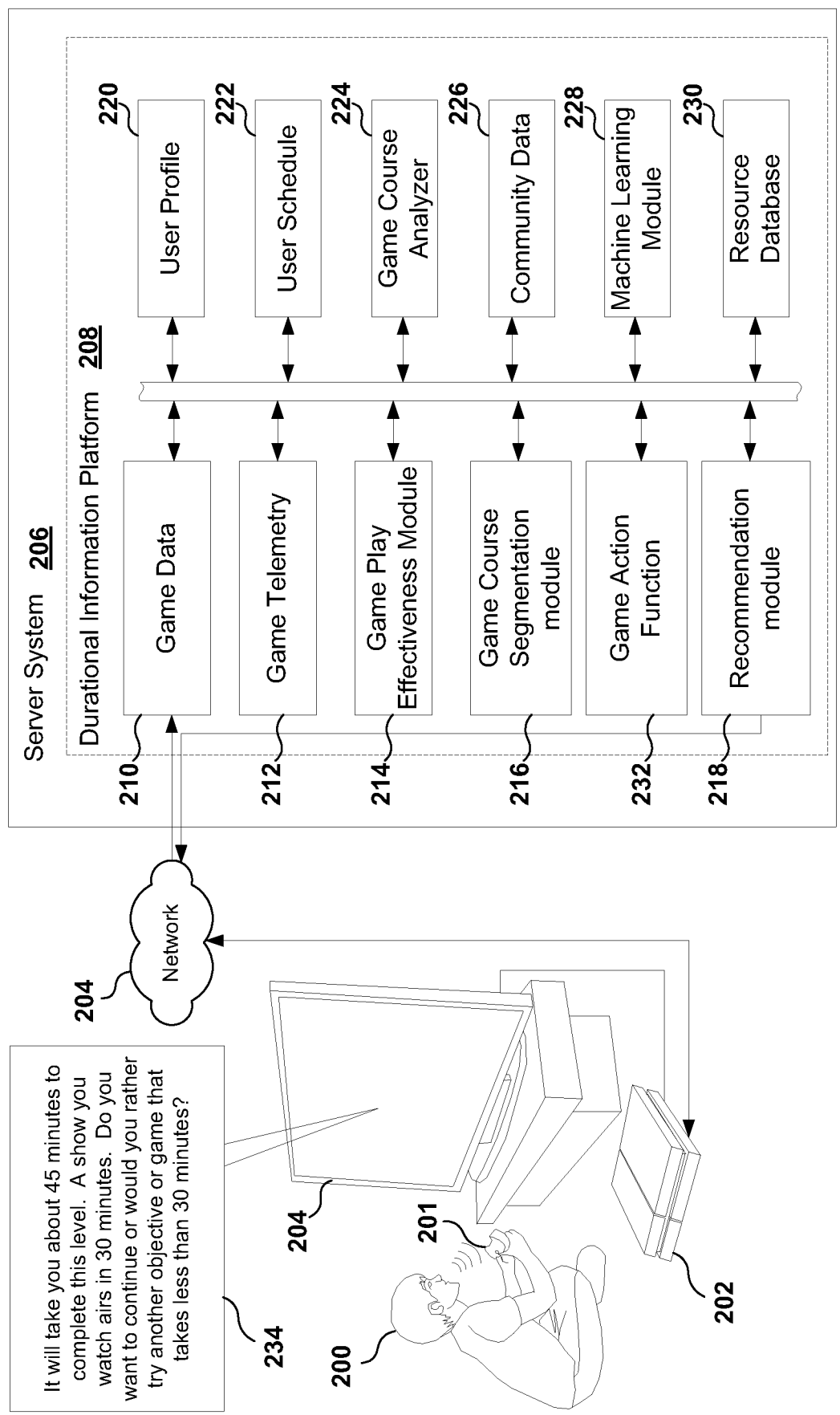
FIG. 2 shows a schematic of a system for implementing a durational information platform, according to one embodiment.

FIG. 2 shows a schematic of a system for implementing a durational information platform 208, according to one embodiment. FIG. 2 shows a user 200 who is playing a video game executed on a local device 202 and displayed on display 204 via a controller 201. Assume for FIG. 2 that user 200 has initiated an in-game task such as completing a mission, a duration for which he does not yet know (e.g., because it is his first time attempting the task). In the embodiment shown, the local device 202, which may be a PlayStation® or related device, communicates certain player-related data to a durational information platform 208 of a server system 206 via network 204. For example, the local device 202 may communicate game data 210 and game telemetry 212 to the durational information platform 208. The game data 210 may include saved data and game state data while the game telemetry 212 may include data related to game input actions received on the controller 201.

The durational information platform 208 is shown to also have access to a user profile 220 and a user schedule 222 of the user 200. The user profile 220 may include data related to the user's in-game preferences, play style, skill level, etc. The user profile 220 may include information related the effectiveness of the user 200 at playing video games as a function of the time of day. For example, if the user is generally less effective between the hours of 12 PM and 5 PM, but becomes more effective between 5 PM and 12 AM, the user profile 220 may track user 200 effectiveness as a function of time of day. Game play effectiveness is used herein to describe generally a player's ability to advance in video games. Game play effectiveness is thus a multifactorial measure that includes user focus/alertness, input accuracy and speed, ability to problem solve, ability to communicate with teammates, resourcefulness, decision making, reaction speed, etc. A user's effectiveness may be described by various models, including a tiered model that depends on time of day. The model may bump a user's effectiveness level up or down depending upon time of day and other activities known of the user.

The user schedule 222, which may be included in the user profile 220, may include data related to a daily or weekly schedule of the user. For example, the user schedule 222 may access the user's calendar or daily planner via an application programming interface (API). The user schedule 222 may also learn via artificial intelligence (AI) certain programming that the user frequently engages in, such as TV shows, news segments, sports games, etc. For example, the user schedule 222 may learn that the user 200 is interested in Golden State Warriors games and San Francisco 49er games. In other embodiments, the user schedule 222 may be manually programmed for activities the user 200 plans to participate in.

The durational information platform 208 is also shown to include a game course analyzer 224, which serves to analyze and predict one or more game courses that the user 200 is endeavoring to complete based on the game data 210. For example, if the user 200 is currently at some current state, the game course analyzer 224 determines what future or subsequent state the user 200 is endeavoring to reach, as well as the course that the user 200 is likely to take in reaching the subsequent state. The game course analyzer 224 may access community data 226 for determining what the subsequent state may be and what the game course may be by assessing various subsequent states of other players as well as various game courses the other players took to reach those subsequent states. The game course analyzer 224 is discussed in greater detail below with reference to FIG. 3. In some embodiments, the game course analyzer 224 may access data from the machine learning module 228 to determine likely game courses from prior game play of the user 200 as well as that of other users.

The durational information platform 208 additionally includes a game course segmentation module 216, a game play effectiveness module 214, and a game action function 232. The game course segmentation module 216 is contemplated to analyze the game course as outputted by the game course analyzer 224 and parse the game course into quasi-discrete segments that are more amenable to durational analysis. For example, if a given game course involves a plurality of sequential but disparate segments, the game course segmentation module 216 may parse the game course into individual segments for which durational analysis may be performed. However, even having individual segments that are more amenable to durational analyses, such analyses may lack accuracy without some data on how effective the user is at playing the segments of the game course.

The game play effectiveness module 214 is therefore contemplated to analyze a player's performance at various aspects of the game, and especially as they may relate to future segments within the game course. For example, the game play effectiveness module 214 may analyze game telemetry 212 of the user 200 to calculate various effectiveness metrics associated with the player's inputs. In one embodiment, the game player effectiveness module 214 compares a player's inputs (e.g., via the controller 201) with an estimated desired input to determine effectiveness metrics. In this sense, the greater symmetry there is between a player's actual inputs and a player's desired inputs, the greater the player's effectiveness metrics will be. The game play effectiveness module 214 is discussed in more detail below with reference to FIG. 4.

The game action function 232 receives inputs from the game course segmentation module 216 and the game play effectiveness module 214 to predict an amount of time or a range of time that the user 200 is likely to require to complete the game course. More particularly, the game action function 232 serves to apply the effectiveness metrics outputted by the game play effectiveness module 214 to the individual segments outputted by the game course segmentation module 216. In some embodiments, the game action function 232 may sum durations calculated for each of the individual course segments to generate a total duration representative of the total time it will take the user 200 to complete the game course. In other embodiments, the game action function 232 may also provision a plurality of simulations of the user 200 playing the game course to completion based upon an AI model of how the player plays. In any case, the game action function 232 provides a duration for completion with respect to the user 200 completing the game course. The game action function 232 is discussed in greater detail below with reference to FIG. 6.

The durational information platform 208 is also shown to include a recommendation module 218, which receives inputs from the user schedule 222, the user profile 220, and the game action function 232 to provide the user 200 recommendations with respect to timing. For example, if the user 200 requests to be provided with some timing related information such as a duration for completion for a game course, the recommendation module 218 may communicate a duration for completion as calculated by the game action function 232 to the local device 202 for communication to the user 200. Additionally, the recommendation module 218 is contemplated to detect timing conflicts that the user 200 may have between completing the current game course and other activities. For example, the recommendation module 218 may detect that a show that the user typically watches is about to air in 30 minutes.

The recommendation module 218 may therefore detect a timing conflict between the user 200 completing the game course prior to the airing of the show. The recommendation module 218 may, in turn, communicate a recommendation 234 to the user 200 indicating the timing conflict. In addition, the recommendation module 218 may access resource database 230 and machine learning module 228 to provide options to the user 200 for avoiding the timing conflict. For example, the recommendation module 218 may suggest an alternate activity (e.g., quest or mission) for the user 200 to participate in that requires less time than completing the game course would, thereby averting the timing conflict. In other embodiments, the recommendation module 218 may suggest a resource from resource database 230 that is likely to speed up the user's completion duration (e.g., reduce the completion duration) such that the user is able to complete the game course prior to the show airing.

Figure 3:
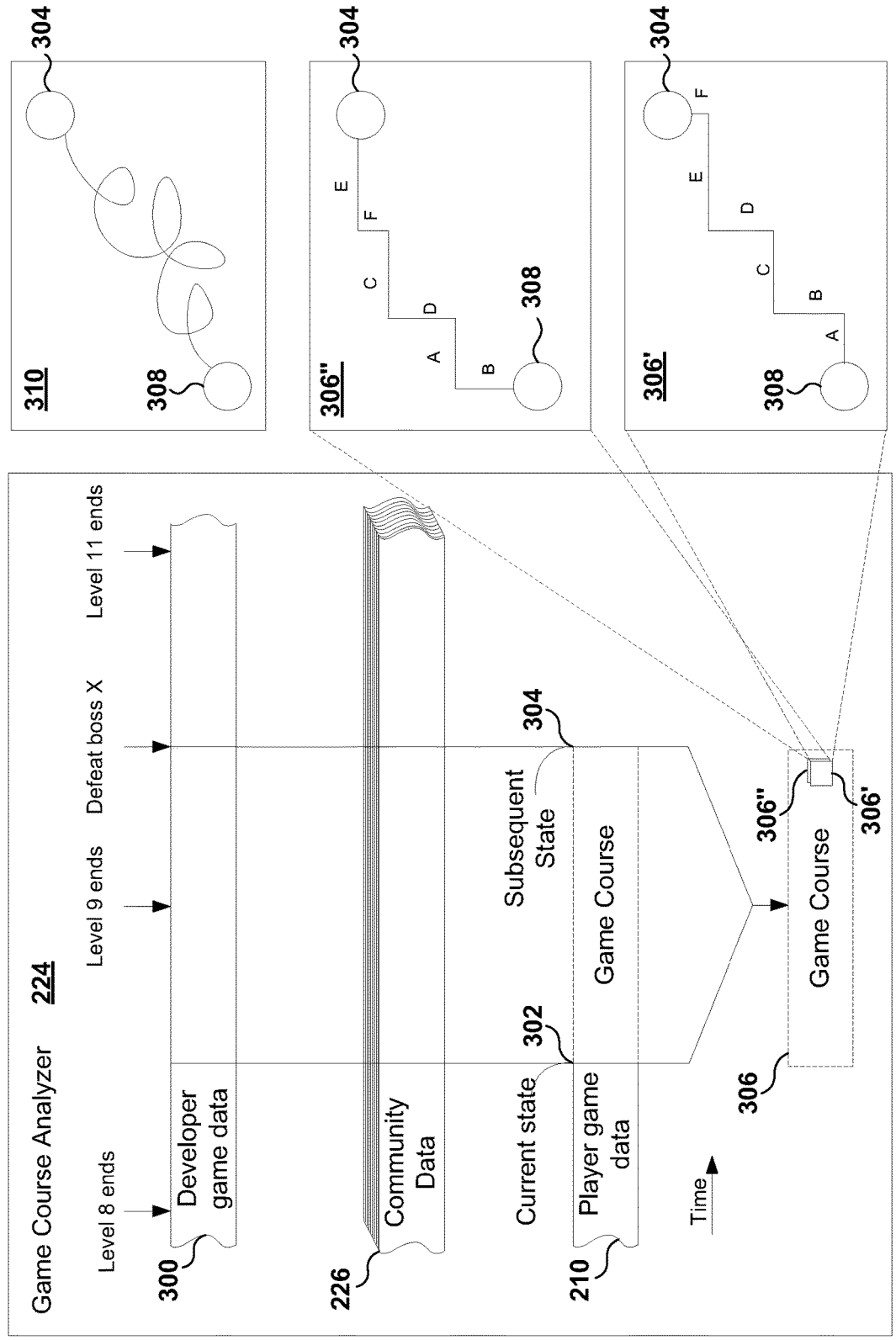
FIG. 3 shows a conceptual diagram of how game course analyzer identifies a subsequent state that player is endeavoring to reach and a game course that represents a sequence of in-game actions that are to occur to reach subsequent state from a current state, according to one embodiment.

FIG. 3 shows a conceptual diagram of how game course analyzer 224 identifies a subsequent state 304 that player is endeavoring to reach and a game course 306 that represents a sequence of in-game actions that are to occur to reach subsequent state 304 from a current state 302, according to one embodiment. Typically, a game course such as game course 306 is a set of data that describes one or more course-dependent paths between a first and second state.

It is contemplated that the game course analyzer 224 has access to developer game data 300, which the game course analyzer 224 may use as a map for identifying various states of interest within the video game. States of interest are points within a video game in which players are more likely to suspend game action (e.g., "load out," pause, save, etc.). States of interest are usually associated with completion of something within the game, such as reaching the next level or stage, completing a task, obtaining an object or character, beating a time, etc. In other situations, a state of interest may not necessarily be associated with a completion, but of a periods in the game where players feel comfortable suspending game action. In FIG. 3, the states of interest are depicted along a timeline of the developer game data 300 when levels 8-11 are shown to end. Additionally, a state of interest is associated with defeating boss X. In this instance, the game course analyzer 224 identifies the subsequent state 304 as being associated with having defeated boss X. This determination may be based on the community data 226 as well as the developer game data 300

The game course analyzer 224 also accesses and analyzes community data 226 for determining the game course 306 based on a plurality of game courses other players have taken to reach the subsequent state 304 from the current state 302. In doing so, the game course analyzer 224 may filter the community data 226 for game courses associated with players who are similar to the player. Additionally, the game course analyzer 224 may identify common patterns within the community data 226 to better define what the game course 306 should contain. For example, if 95% of players performed task A while 5% of players did not during their completion of the game course, the game course analyzer 224 may include task A in the game course 306. In other embodiments, the game course analyzer 224 may include task A in a probabilistic manner.

FIG. 3 also shows two portions 306' and 306" of game course 306. The portions 306' and 306" are similar in that they both describe a sequence of in-game events or actions that lead from prior state 308 to the subsequent state 304. They are different in that the precise sequence of actions is not the same. For example, the sequence of actions in portion 306' is shown as A-B-C-D-E-F, whereas the sequence of actions in portion 306" is shown s B-A-D-C-F-E. Both of these variations may be incorporated into the game course 306 such that it captures various similar but not identical sequences of action to accomplish the same objective, e.g., reaching subsequent state 304.

However, not all instances of played game courses should be included in game course 306. For example, portion 310 shows a sequence of game actions that is circuitous and not representative of how most players would complete the game course 306. As a result, portion 310 is not included within the game course 306 because it has little predictive value for determining the game course 306 the player is likely to take.

Figure 4:
FIG. 4 shows a conceptual diagram of how a game play effectiveness module determines effectiveness metrics based on game telemetry according to one embodiment.

FIG. 4 shows a conceptual diagram of how a game play effectiveness module 214 determines effectiveness metrics 401 based on game telemetry 212 according to one embodiment. A player's effectiveness at playing the game bears on how much time it will take the player to complete a game course. The player's effectiveness metrics 401 are contemplated to be one way to capture and quantify the player's effectiveness and add predictive value to an estimation of time to complete various game courses.

In FIG. 4, game telemetry 212 of the player is shown to include game action inputs 400, which may include controller or other types of game inputs, and game response 402, which may include game states that occur in response to each of the game action inputs 400. In response to the game action inputs 400 and the game response 402, the game play effectiveness module 214 also generates predicted desired game response 404 and a corresponding predicted desired game action input 406. The predicted desired game response 404 is a prediction of what the player was trying to accomplish in the game. In some embodiments, the game play effectiveness module 214 may have access to various sources for determining the predicted desired game response 404, including, for example, a database of commonly committed in-game mistakes, an AI learning module, community data, developer data, etc. Each of these assist the game play effectiveness module 214 in determining what the likely desired response was for any particular game action input.

The predicted desired game action input 406 is simply the corresponding input combinations for achieving the predicted desired game response 404. An effectiveness record 408 records an indication of whether there is a match or correspondence between the predicted desired game response 404 and the game response 402 caused by the game action input 400. In FIG. 4, an "X" on the effectiveness record 408 indicates that the game response 402 does not match or correspond to the predicted desired game response 404, whereas a "check" mark indicates that it does. Other indications may also be used to record, for example, how accurate a player's game inputs are compared to what the desired game output is.

Four distinct game action inputs 410a, 412a, 414a, and 416a occurring during a player's interactivity with a video game are shown along a timeline for the game action input 400. Game action input 410a, for example, includes an input combination of X-circle-triangle that produces a game response 410b of a jump. It may be that the player was actually attempting to do a power jump instead of a jump as shown in the predicted desired game response 410c. Thus, the player should have or was trying to input triangle-X-circle as the predicted desired game action input 406. Because the predicted desired game response 410d does not match the game response 410b, a failed attempt 410e is recorded on the effectiveness record 408. A similar process is performed for the remaining game action inputs 412a, 414a, and 416a. For example, game input 412a of up-triangle results in a game response 412b of a leap forward. However, it could be the case that the player was attempting to do an uppercut as indicated by the predicted desired game response 412c. Again, because the game response 412b and the predicted desired game response 412c does not match, a failed attempt 412e is recorded in the effectiveness record 408.

In the next game action input 414a of X-circle-triangle, the user repeats the same mistake as they did in game action input 410a. The corresponding game response 414b is a jump whereas the predicted desired game response 414c is again a power jump. The effectiveness record 408 is shown to have a second failed attempt 414e recorded. The player inputs the next game action input 416a correctly, which results in a game response 416b of upper cut that matches predicted desired game action response 416c, also of upper cut. As a result, a successful attempt 416e is recorded on the effectiveness record 408.

The game play effectiveness module 214 is contemplated to use the game action inputs 400, the game response 402, the predicted desired game response 404, and the predicted game action input 406, as well as the effectiveness record 408 to generate and update effectiveness metrics 401. The effectiveness metrics 401 describes how effective the player is at various game-related tasks.

FIG. 5 illustrates certain elements of effectiveness metrics 401 as generated and updated by the game play effectiveness module 214, according to one embodiment. It is contemplated that there are three general categories or tiers of game-related performance that the effectiveness metrics 401 seeks to capture: general ability 500, task-oriented ability 502, and implementation ability 504. General ability 500 may, for example, include higher-level indicators of a player's skill level, overall hand-controller coordination, hand-eye coordination, dexterity, precision, reaction time, problem solving skills, ability to cooperate with others, economy of game action inputs, efficiency of game action inputs, timing between controller inputs, etc. General ability tends to indicate a player's overall experience and skill that translates to many types of game environments and different game titles. Metrics that describe general ability may examine game telemetry of a player over longer periods of game play and for different game titles. The general ability 500 metrics may be individually scored, and corrective actions may be suggested to help players improve upon lower-scoring types of general ability. For example, if a player is determined to have a relatively low score for hand-controller coordination, a corrective action could include a playable module that trains a player's hand-controller coordination.

Task-oriented ability 502 refers to a player's ability to perform specific types of tasks, including, for example, navigation, getting over obstacles, using tools, aiming, building structures, finding and picking items, etc. Task-oriented ability 502 is contemplated to assess a player's effectiveness at a finer-grain level than general ability 500. Task-oriented ability 502 metrics may also be scored individually for different tasks and corrective actions may be suggested to help players improve upon lower-scoring types of task-oriented abilities. For example, if a player is determined to have a relatively low score for building structures, a corrective action may include a module that trains players how to build structures more effectively.

Implementation ability 504 refers to a player's ability to perform specific game actions that are used to complete tasks, e.g., controller inputs. For example, implementation ability 504 may assess a player's ability to accurately and timely perform actions within the game such as shooting, lobbing, jumping, changing weapons, performing a combination, etc. The implementation ability 504 may therefore assess a player's ability to input the correct input combinations with correct timing. For example, given the effectiveness record 408 in FIG. 4, the effectiveness metrics 401 may indicate that the player is not effective at performing a "power jump," but is decently effective at performing an "upper cut." Accordingly, the implementation ability 502 may suggest a corrective action of practicing the input combination of triangle-X-circle such that the player accurately performs in the combination in the future.

Figure 6:
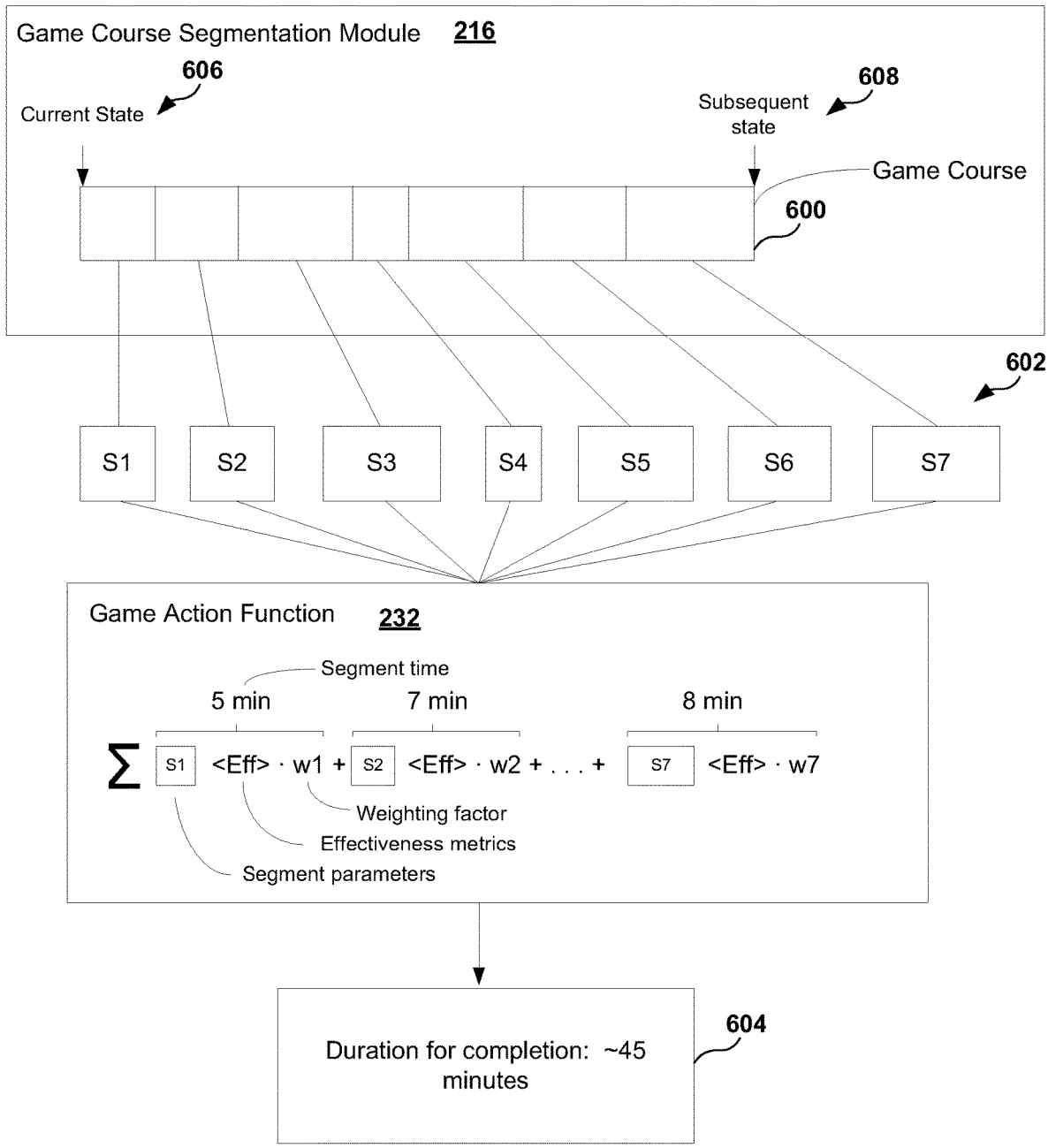
FIG. 6 shows a conceptual diagram of a game action function that is used to generate a duration for completion that a player is predicted to use to complete a game course, according to one embodiment.

FIG. 6 shows a conceptual diagram of a game action function 232 that is used to generate a duration for completion 604 that a player is predicted to use to complete a game course 600. The game course 600 is defined by a portion of a video game between a current state 606 and a subsequent state 608 within the video game. For example, the current state 606 may correspond to the beginning of a certain level, while the subsequent state 608 may correspond to game state where that level has been completed. The, the game course 600 is defined by those game states or game trajectories that result in a player completing the level. The game course 600 is shown to be segmented into seven game course segments 602 (e.g., S1-S7) by a game course segmentation module 216. Of course, there may be many ways in which a player can complete a given level. However, generally, there will be segments a player must complete to complete the level.

Each of the game course segments 602 may represent a task or objective to be performed or completed to reach the subsequent state 608. Each of the game course segments 602 may thus use differing amounts of time to complete, on average. Moreover, each of the game course segments 602 may reward or depend upon differing types of general ability, task-oriented ability, and implementation ability. For example, segment S1 may include a task that emphasizes navigation more so than segment S2, whereas segment S2 emphasizes building structures more so than segment S1. As a result, if a player is determined to have a higher navigation metric relative to his or her metric for building structures, the game action function 232 will account for these differences when calculating the duration for completion 604.

Moreover, each game course segment 602 may place greater emphasis on a certain set of implementation abilities than it does others. For example, segment S3 may be a resource collecting task that requires the frequent use of the "pick-up" game action, while segment S4 may be a fighting task that requires the frequent use of attack combination game action. If a player has better implementation skills for game actions associated with picking up resources than they do for attack combinations, the game action function 232 will account for such differences when calculating the duration for completion. Further, certain types of general ability may serve to make a player more effective at certain game course segments 602 over others. The game action function 232 may also account for these differences when calculating the duration for completion 604.

An embodiment of the game action function 232 is shown as a summation of an estimated time for completion associated with each of the game course segments 602. Generally, effectiveness is contemplated to correlate with the speed at which a player is to complete a particular segment. Each term in the summation corresponds to estimated time for completion for a respective game course segment 602, and may be approximated as a function of parameters of the segment, effectiveness metrics, and a weighting factor. The segment parameters may specify, for example, the types of general ability, task-oriented ability, and implementation ability that users are expected to rely on to complete the particular segment.

Additionally, the segment parameters may have duration indicators that specify the durational length of the segment, for example, by accounting for the number of actions required to complete the segments and their difficulty level. The effectiveness metrics that are pertinent to the segment are applied to the segment to return an initial completion time for the segment. The completion time is then weighted by a weighting factor that captures various other factors impinging on the completion time for the segment. For example, the weighting factor may account for player fatigue, or level of focus, or in-game parameters, etc. Once the weighting factor is applied to the initial completion time for the segment, the game action function 232 is able to approximate the completion time for the particular segment. The same process is repeated for each of the seven game course segments 602, which enables the game action function 232 to predict a duration for completion 604 for the entire game course 600.

Additionally, it is contemplated that the duration for completion 604 may be updated periodically or in real time as the player begins to play the game course. For example, if the player struggles with segment 1 and takes longer than the expected time as calculated by the game action function 232, the game action function may adjust the duration for completion 604 to reflect the player's ineffectiveness at segment 1. The game action function 232 may adjust the duration for completion 604 by weighting the remaining segments 2-7 to account for the player's present lack of effectiveness.

In some embodiments, segments may be optional or skipped or jumped. The game action function 232 is contemplated to account for such optional segments, for example, by estimating whether the player is likely to skip the segment or not. The game action function 232 may access a machine learning module to determine the likelihood that players in general and the specific player will skip or jump a particular segment. Moreover, if the player does play the optional segment, the game action function 232 will be update the duration for completion 604 to also reflect the amount of time the player is likely to spend on the optional segment. If instead the player skips the segment, the game action function 232 will likewise update the duration for completion 604 to reflect the fact that the player skipped the segment.

Figure 7:
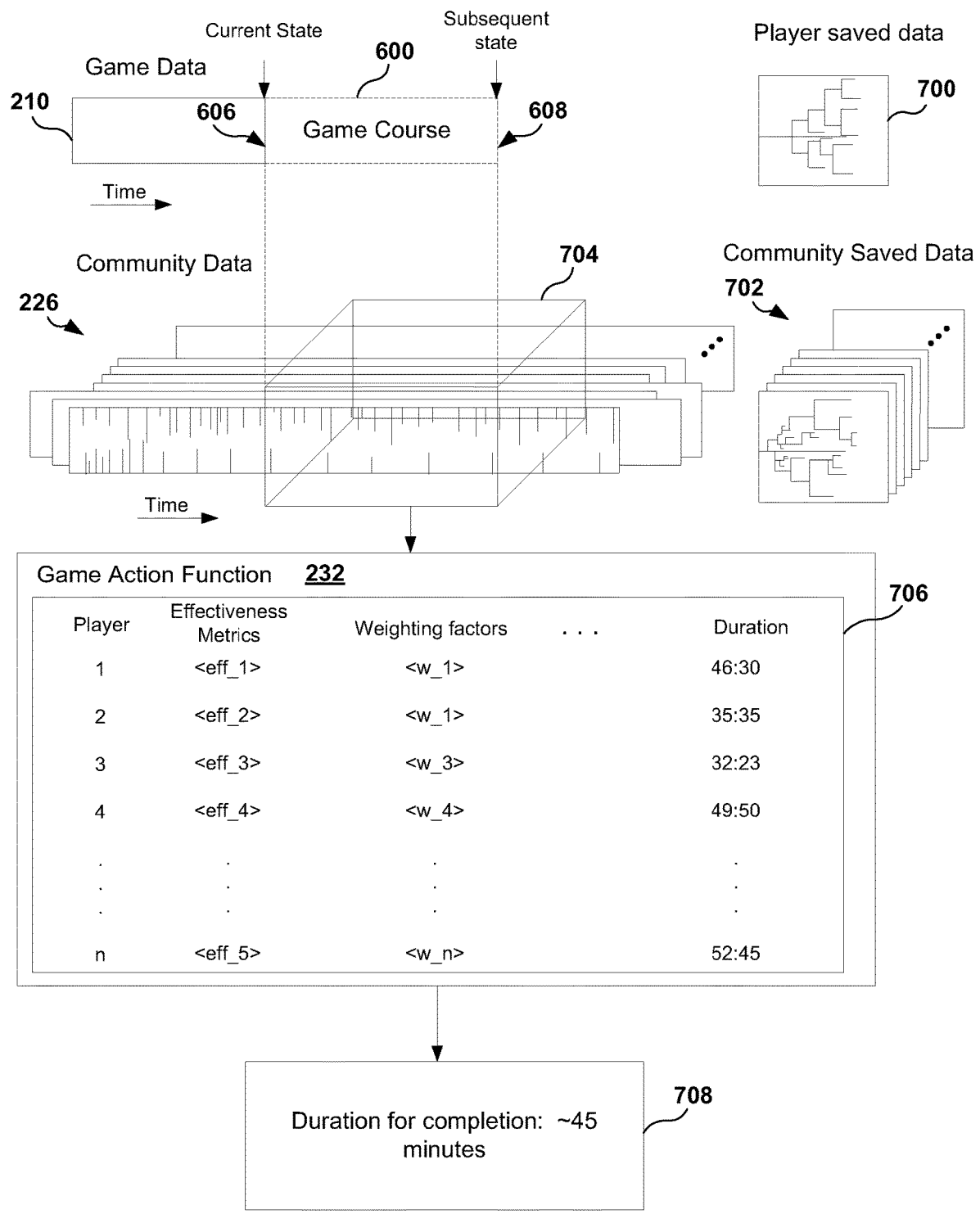
FIG. 7 shows a conceptual illustration of an additional embodiment of a game action function that uses community data to calculate a duration for completion, according to one embodiment.

FIG. 7 shows a conceptual illustration of an additional embodiment of a game action function 232 that uses community data 226 to calculate a duration for completion 708, according to one embodiment. Game data 210 of the player is used to identify a game course 600, e.g., by a game course analyzer 224. The game course 600 is shown to be defined by a current state 606 and a subsequent state 608 that represents a state in which the player accomplishes what he or she sets out to accomplish within the video game. The game data 210 is associated with saved data 700, which may include information about the progress of the user in the game and is not generally time-dependent. Saved data 700, for example, may include a list of inventory, a list of abilities, a level value, a character value, a stage value. The game action function 232 uses a classifier window 704 that searches game data from a plurality of players within the community data 226. The community game data 226 is shown to be associated with respective community saved data 702, which may be useful for determining which of the community data 226 is more predictive of the player's estimated duration for completion 708. The classifier window 704 classifies game data of players that have been in the current state 606 and subsequently reached the subsequent state 608 and records a duration associated with those players reaching the subsequent state from the current state 606 in a classifier table 706.

The classifier table 706 is shown to include durational data from other players who completed the game course 600. For example, players 1, 2, 3, 4 and n are shown to have completed the game course in 46 minutes and 30 second, 35 minutes and 35 seconds, 32 minutes and 23 seconds, 49 minutes and 50 seconds, and 52 minutes and 45 seconds, respectively. The classifier table 706 is also shown to include effectiveness metrics and weighting metrics for each player. The game action function 232 is contemplated to classify those players whose effectiveness metrics and weighting factors best fit that of the present player. The game action function 232 is then shown to output a duration for completion 708 of 45 minutes based on the durations used by other players having similar effectiveness metrics and weighting factors as the present player.

Figure 8A:
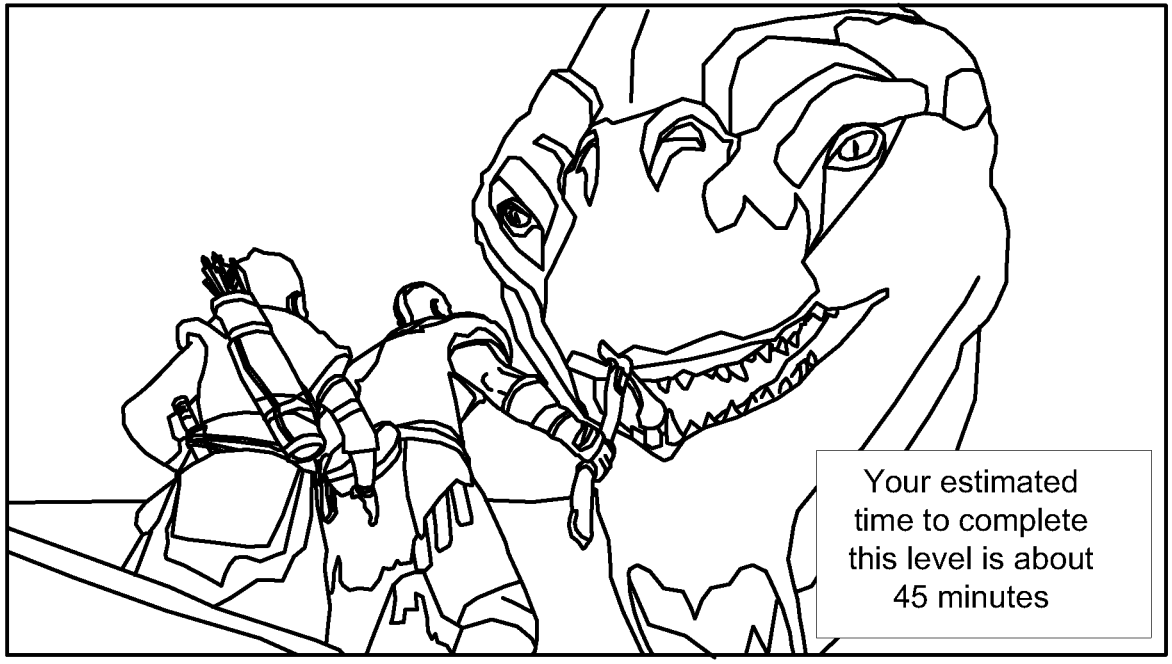
FIGS. 8A and 8B illustrate in-game scenarios in which a player's duration for completion for a game course is presented to a player to assist the player in making decisions, according to various embodiments.
Figure 8B:
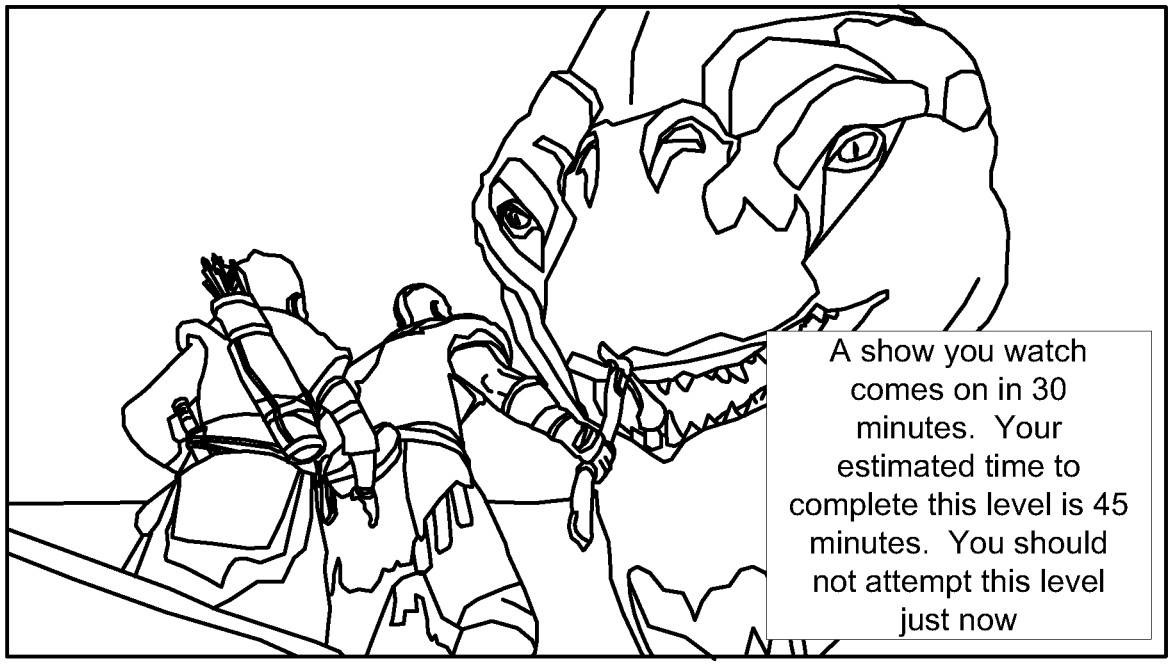

FIGS. 8A and 8B illustrate in-game scenarios in which a player's duration for completion for a game course is presented to a player to assist the player in making decisions, according to one embodiment. In FIG. 8A, a player is currently attempting to complete the present level by defeating a boss. The player does not otherwise know how long it will take to complete the level until the durational information platform provides a notification that apprises them that their estimate time to complete the level (e.g., duration to completion) is about 45 minutes.

In FIG. 8B, the durational information platform provides the player with a notification that a show the player watches is about to air in 30 minutes, whereas the duration to completion for the level is estimated to be 45 minutes. The durational information platform recommends that the player should not attempt to complete the level just now.

Figure 9A:
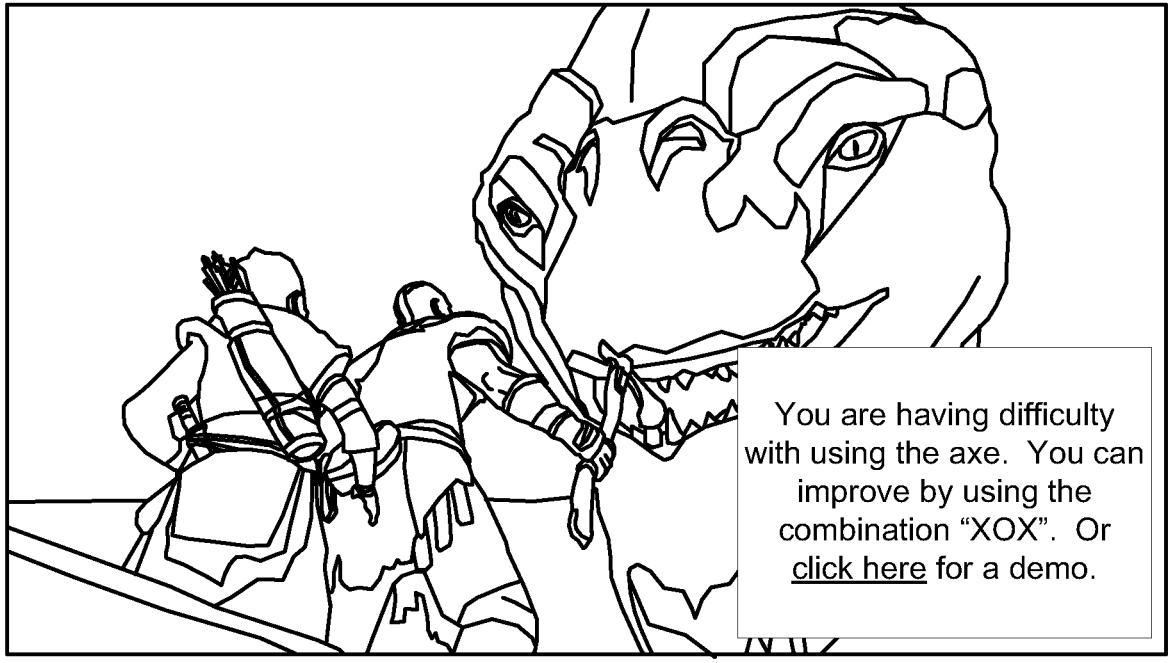
FIGS. 9A and 9B show additional embodiments of the durational information platform that can assist a player to meet durational needs, according to various embodiments.
Figure 9B:
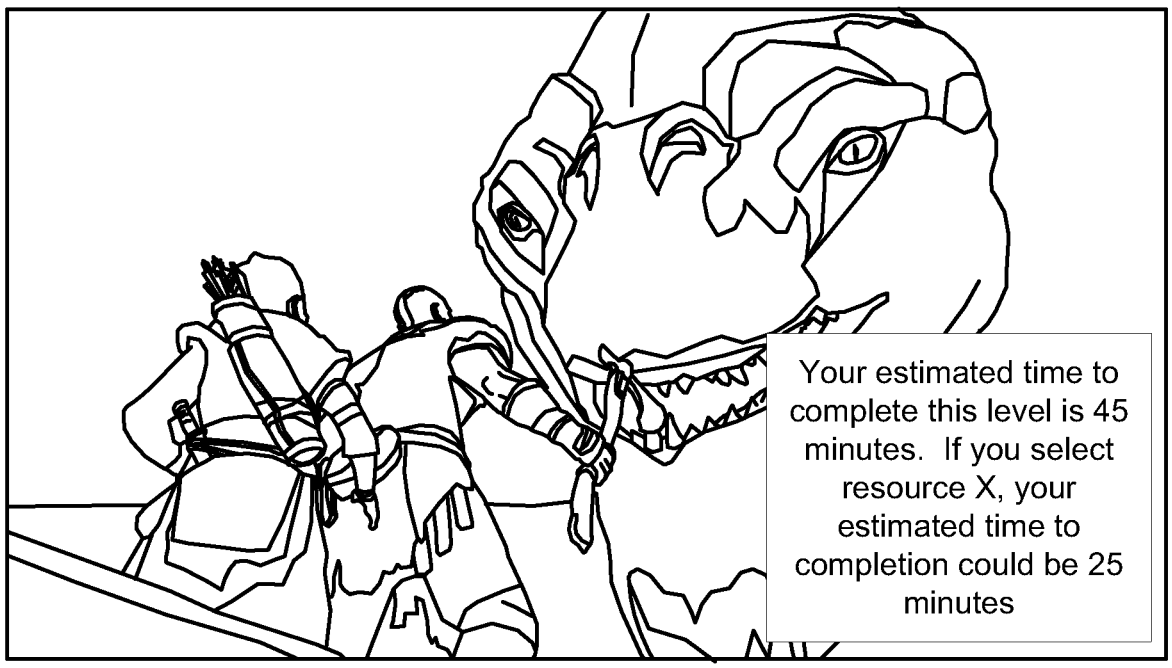

FIGS. 9A and 9B show additional embodiments of the durational information platform that can assist a player to meet durational needs, according to various embodiments. In FIG. 9A, the game play effectiveness module has identified a game action input deficiency regarding the use of the axe and informs the player of such deficiency along with a corrective action. The notification specifies that the player can improve upon use of the axe by practicing the combination X-circle-X. The notification also provides an option to practice the game input action via a demonstration.

In FIG. 9B, the durational information platform provides a duration to completion of 45 minutes to the player. In addition, the durational information platform provides an option for the player to reduce the duration to completion to 25 minutes if the player chooses to use (e.g., purchase) resource X. In this manner, the player is provided with concrete durational information as to whether or not to select resource X. The game developer is further provided with a commerce opportunity (e.g., microtransaction) to feature a resource that may help the player save time.

Figure 10:
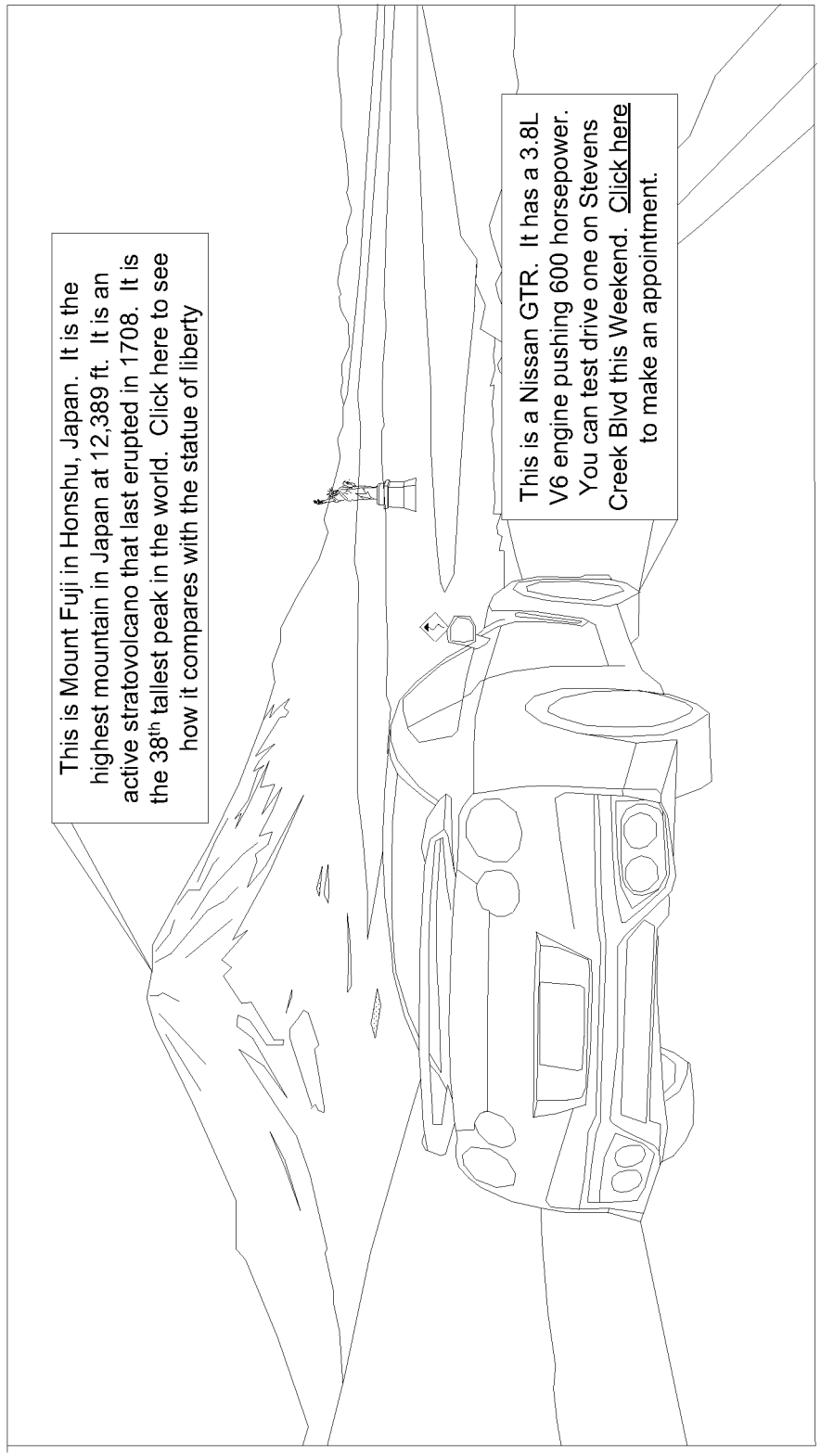
FIG. 10 illustrates how an in-game information platform can enhance a player's overall game play experience by providing context-specific information, according to one embodiment.

FIG. 10 illustrates how an in-game information platform can enhance a player's overall game play experience by providing context-specific information, according to one embodiment. Often, video games will feature representations of real-world environments or objects. For example, video games might be set in World War II Europe or the streets of modern-day Los Angeles. Moreover, video games may feature real world objects and people such as cars, weapons, public figures, etc. Further, there may be commentary that a game developer may wish to express in relation to in-game action. A player's overall gaming experience may be enhanced by providing players with bonus information regarding contextually-related information. In FIG. 10, the player is provided with bonus information regarding the make and model of the car they are driving. The player is also provided with bonus information about a landmark that appears in the video game scene. It is contemplated that the bonus information made available to the player is dependent upon player preferences that may be recorded in the player profile. For example, if the player profile indicates that the player has an interest in cars but not geographical landmarks, it may display the bonus information regarding the car but not that for Mount Fuji.

Figure 11:
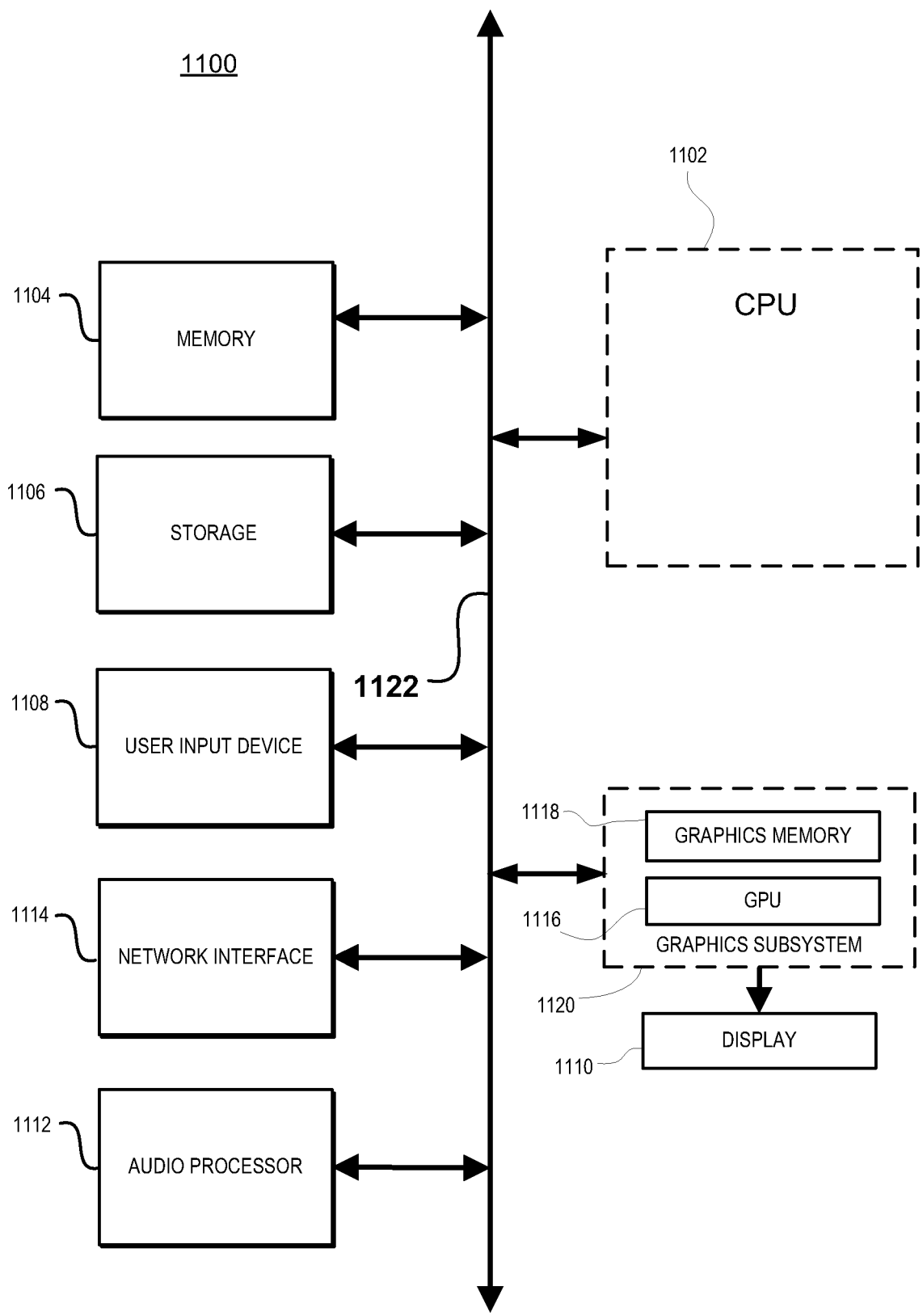
FIG. 11 illustrates components of an example device that can be used to perform aspects of the various embodiments of the present disclosure.

FIG. 11 illustrates components of an example device 1100 that can be used to perform aspects of the various embodiments of the present disclosure. For example, FIG. 11 illustrates an exemplary hardware system suitable for implementing a device that provides services in support of a user, such as for surfacing contextually relevant in-game resources for use by a player in response to a query or for surfacing contextually in-store resources for use by a player, in accordance with one embodiment. This block diagram illustrates a device 1100 that can incorporate or can be a personal computer, video game console, personal digital assistant, a server or other digital device, suitable for practicing an embodiment of the disclosure. Device 1100 includes a central processing unit (CPU) 1102 for running software applications and optionally an operating system. CPU 1102 may be comprised of one or more homogeneous or heterogeneous processing cores. For example, CPU 1102 is one or more general-purpose microprocessors having one or more processing cores. Further embodiments can be implemented using one or more CPUs with microprocessor architectures specifically adapted for highly parallel and computationally intensive applications, such as processing operations of interpreting a query, identifying contextually relevant resources, and implementing and rendering the contextually relevant resources in a video game immediately. Device 1100 may be a localized to a player playing a game segment (e.g., game console), or remote from the player (e.g., back-end server processor).

Memory 1104 stores applications and data for use by the CPU 1102. Storage 1106 provides non-volatile storage and other computer readable media for applications and data and may include fixed disk drives, removable disk drives, flash memory devices, and CD-ROM, DVD-ROM, Blu-ray, HD-DVD, or other optical storage devices, as well as signal transmission and storage media. User input devices 1108 communicate user inputs from one or more users to device 1100, examples of which may include keyboards, mice, joysticks, touch pads, touch screens, still or video recorders/cameras, tracking devices for recognizing gestures, and/or microphones. Network interface 1114 allows device 1100 to communicate with other computer systems via an electronic communications network, and may include wired or wireless communication over local area networks and wide area networks such as the internet. An audio processor 1112 is adapted to generate analog or digital audio output from instructions and/or data provided by the CPU 1102, memory 1104, and/or storage 1106. The components of device 1100, including CPU 1102, memory 1104, data storage 1106, user input devices 1108, network interface 1110, and audio processor 1112 are connected via one or more data buses 1122.

A graphics subsystem 1120 is further connected with data bus 1122 and the components of the device 1100. The graphics subsystem 1120 includes a graphics processing unit (GPU) 1116 and graphics memory 1118. Graphics memory 1118 includes a display memory (e.g., a frame buffer) used for storing pixel data for each pixel of an output image. Graphics memory 1118 can be integrated in the same device as GPU 1108, connected as a separate device with GPU 1116, and/or implemented within memory 1104. Pixel data can be provided to graphics memory 1118 directly from the CPU 1102. Alternatively, CPU 1102 provides the GPU 1116 with data and/or instructions defining the desired output images, from which the GPU 1116 generates the pixel data of one or more output images. The data and/or instructions defining the desired output images can be stored in memory 1104 and/or graphics memory 1118. In an embodiment, the GPU 1116 includes 3D rendering capabilities for generating pixel data for output images from instructions and data defining the geometry, lighting, shading, texturing, motion, and/or camera parameters for a scene. The GPU 1116 can further include one or more programmable execution units capable of executing shader programs.

The graphics subsystem 1114 periodically outputs pixel data for an image from graphics memory 1118 to be displayed on display device 1110. Display device 1110 can be any device capable of displaying visual information in response to a signal from the device 1100, including CRT, LCD, plasma, and OLED displays. Device 1100 can provide the display device 1110 with an analog or digital signal, for example.

While specific embodiments have been provided to demonstrate the surfacing of contextually-relevant resources to players, these are described by way of example and not by way of limitation. Those skilled in the art having read the present disclosure will realize additional embodiments falling within the spirit and scope of the present disclosure.

It should be noted, that access services, such as providing access to games of the current embodiments, delivered over a wide geographical area often use cloud computing. Cloud computing is a style of computing in which dynamically scalable and often virtualized resources are provided as a service over the Internet. Users do not need to be an expert in the technology infrastructure in the "cloud" that supports them. Cloud computing can be divided into different services, such as Infrastructure as a Service (IaaS), Platform as a Service (PaaS), and Software as a Service (SaaS). Cloud computing services often provide common applications, such as video games, online that are accessed from a web browser, while the software and data are stored on the servers in the cloud. The term cloud is used as a metaphor for the Internet, based on how the Internet is depicted in computer network diagrams and is an abstraction for the complex infrastructure it conceals.

A game server may be used to perform the operations of the durational information platform for video game players, in some embodiments. Most video games played over the Internet operate via a connection to the game server. Typically, games use a dedicated server application that collects data from players and distributes it to other players. In other embodiments, the video game may be executed by a distributed game engine. In these embodiments, the distributed game engine may be executed on a plurality of processing entities (PEs) such that each PE executes a functional segment of a given game engine that the video game runs on. Each processing entity is seen by the game engine as simply a compute node. Game engines typically perform an array of functionally diverse operations to execute a video game application along with additional services that a user experiences. For example, game engines implement game logic, perform game calculations, physics, geometry transformations, rendering, lighting, shading, audio, as well as additional in-game or game-related services. Additional services may include, for example, messaging, social utilities, audio communication, game play replay functions, help function, etc. While game engines may sometimes be executed on an operating system virtualized by a hypervisor of a particular server, in other embodiments, the game engine itself is distributed among a plurality of processing entities, each of which may reside on different server units of a data center.

According to this embodiment, the respective processing entities for performing the may be a server unit, a virtual machine, or a container, depending on the needs of each game engine segment. For example, if a game engine segment is responsible for camera transformations, that particular game engine segment may be provisioned with a virtual machine associated with a graphics processing unit (GPU) since it will be doing a large number of relatively simple mathematical operations (e.g., matrix transformations). Other game engine segments that require fewer but more complex operations may be provisioned with a processing entity associated with one or more higher power central processing units (CPUs).

By distributing the game engine, the game engine is provided with elastic computing properties that are not bound by the capabilities of a physical server unit. Instead, the game engine, when needed, is provisioned with more or fewer compute nodes to meet the demands of the video game. From the perspective of the video game and a video game player, the game engine being distributed across multiple compute nodes is indistinguishable from a non-distributed game engine executed on a single processing entity, because a game engine manager or supervisor distributes the workload and integrates the results seamlessly to provide video game output components for the end user.

Users access the remote services with client devices, which include at least a CPU, a display and I/O. The client device can be a PC, a mobile phone, a netbook, a PDA, etc. In one embodiment, the network executing on the game server recognizes the type of device used by the client and adjusts the communication method employed. In other cases, client devices use a standard communications method, such as html, to access the application on the game server over the internet.

Embodiments of the present disclosure may be practiced with various computer system configurations including hand-held devices, microprocessor systems, microprocessor-based or programmable consumer electronics, minicomputers, mainframe computers and the like. The disclosure can also be practiced in distributed computing environments where tasks are performed by remote processing devices that are linked through a wire-based or wireless network.

It should be appreciated that a given video game or gaming application may be developed for a specific platform and a specific associated controller device. However, when such a game is made available via a game cloud system as presented herein, the user may be accessing the video game with a different controller device. For example, a game might have been developed for a game console and its associated controller, whereas the user might be accessing a cloud-based version of the game from a personal computer utilizing a keyboard and mouse. In such a scenario, the input parameter configuration can define a mapping from inputs which can be generated by the user's available controller device (in this case, a keyboard and mouse) to inputs which are acceptable for the execution of the video game.

In another example, a user may access the cloud gaming system via a tablet computing device, a touchscreen smartphone, or other touchscreen driven device. In this case, the client device and the controller device are integrated together in the same device, with inputs being provided by way of detected touchscreen inputs/gestures. For such a device, the input parameter configuration may define particular touchscreen inputs corresponding to game inputs for the video game. For example, buttons, a directional pad, or other types of input elements might be displayed or overlaid during running of the video game to indicate locations on the touchscreen that the user can touch to generate a game input. Gestures such as swipes in particular directions or specific touch motions may also be detected as game inputs. In one embodiment, a tutorial can be provided to the user indicating how to provide input via the touchscreen for gameplay, e.g. prior to beginning gameplay of the video game, so as to acclimate the user to the operation of the controls on the touchscreen.

In some embodiments, the client device serves as the connection point for a controller device. That is, the controller device communicates via a wireless or wired connection with the client device to transmit inputs from the controller device to the client device. The client device may in turn process these inputs and then transmit input data to the cloud game server via a network (e.g. accessed via a local networking device such as a router). However, in other embodiments, the controller can itself be a networked device, with the ability to communicate inputs directly via the network to the cloud game server, without being required to communicate such inputs through the client device first. For example, the controller might connect to a local networking device (such as the aforementioned router) to send to and receive data from the cloud game server. Thus, while the client device may still be required to receive video output from the cloud-based video game and render it on a local display, input latency can be reduced by allowing the controller to send inputs directly over the network to the cloud game server, bypassing the client device.

In one embodiment, a networked controller and client device can be configured to send certain types of inputs directly from the controller to the cloud game server, and other types of inputs via the client device. For example, inputs whose detection does not depend on any additional hardware or processing apart from the controller itself can be sent directly from the controller to the cloud game server via the network, bypassing the client device. Such inputs may include button inputs, joystick inputs, embedded motion detection inputs (e.g. accelerometer, magnetometer, gyroscope), etc. However, inputs that utilize additional hardware or require processing by the client device can be sent by the client device to the cloud game server. These might include captured video or audio from the game environment that may be processed by the client device before sending to the cloud game server. Additionally, inputs from motion detection hardware of the controller might be processed by the client device in conjunction with captured video to detect the position and motion of the controller, which would subsequently be communicated by the client device to the cloud game server. It should be appreciated that the controller device in accordance with various embodiments may also receive data (e.g. feedback data) from the client device or directly from the cloud gaming server.

It should be understood that the various embodiments defined herein may be combined or assembled into specific implementations using the various features disclosed herein. Thus, the examples provided are just some possible examples, without limitation to the various implementations that are possible by combining the various elements to define many more implementations. In some examples, some implementations may include fewer elements, without departing from the spirit of the disclosed or equivalent implementations.

Embodiments of the present disclosure may be practiced with various computer system configurations including hand-held devices, microprocessor systems, microprocessor-based or programmable consumer electronics, minicomputers, mainframe computers and the like. Embodiments of the present disclosure can also be practiced in distributed computing environments where tasks are performed by remote processing devices that are linked through a wire-based or wireless network.

Although the method operations were described in a specific order, it should be understood that other housekeeping operations may be performed in between operations, or operations may be adjusted so that they occur at slightly different times or may be distributed in a system which allows the occurrence of the processing operations at various intervals associated with the processing, as long as the processing of the telemetry and game state data for generating modified game states and are performed in the desired way.

One or more embodiments can also be fabricated as computer readable code on a computer readable medium. The computer readable medium is any data storage device that can store data, which can be thereafter be read by a computer system. Examples of the computer readable medium include hard drives, network attached storage (NAS), read-only memory, random-access memory, CD-ROMs, CD-Rs, CD-RWs, magnetic tapes and other optical and non-optical data storage devices. The computer readable medium can include computer readable tangible medium distributed over a network-coupled computer system so that the computer readable code is stored and executed in a distributed fashion.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A method, comprising:
   processing, at a server, game data of a player of a video game for determining a game course the player is to take between a current state and a subsequent state within the video game;
   identifying a plurality of segments that are sequential within the game course, each of the plurality of segments is to be completed by the player by inputting game action inputs to achieve corresponding game responses;
   processing, at the server, game telemetry of the player from prior segments of the video game for determining effectiveness metrics, the game telemetry includes game action inputs and the corresponding game responses;
   calculating, using a game action function, an estimated time the player is to use to traverse the game course to reach the subsequent state based on the effectiveness metrics; and
   generating a recommendation for communication to a device of the player, the recommendation includes the estimated time for the player to reach the subsequent state.

2. The method of claim 1, wherein the game action function applies the effectiveness metrics to each of the plurality of segments to obtain respective estimated times for the player to complete each of the plurality of segments, the game action function sums the respective estimated times for the player to complete each of the plurality of segments for said calculating the estimated time.

3. The method of claim 2, wherein the game action function applies a weighting factor to the respective segments, the weighting factor is indicative of how effective a player is performing within the video game prior to playing the game course.

4. The method of claim 1, wherein said processing the game telemetry of the player includes comparing the game action inputs and the corresponding game responses with desired game responses for determining the effectiveness metrics.

5. The method of claim 1, wherein said calculating the estimated time using the game action function further includes adjusting the estimated time based a current time and based on a player profile of the player, the player profile is tracks player effectiveness as a function of time of day.

6. The method of claim 1, further comprising:
   identifying a resource from a database of resources usable by the player to traverse the game course in a time that is less than the estimated time;
   calculating, using the game action function, a second estimate time the player is to use to traverse the game course to reach the subsequent state using the resource based on the effectiveness metric, the second estimated time being less than the estimated time; and providing, in the recommendation, an option for selecting the resource and an indication of the second estimated time.

7. The method of claim 1, further comprising:
identifying, from a user profile, a user activity associated with a predetermined time of day;
determining that the player will not reach the subsequent state before the predetermined time of day associated with the user activity based on a current time and the estimated time; and
providing in the recommendation an indication that the player will not reach the subsequent state before the user activity is to occur at the predetermined time of day.

8. The method of claim 1, further comprising:
identifying, from the game telemetry, a game action input deficiency based on the game action inputs, the corresponding game responses, and desired game responses;
providing, in the recommendation, a tip for correcting the game action input deficiency.

9. The method of claim 1, wherein said processing the game data for determining the game course includes using a game course analyzer that accesses community game data or developer game data for determining the subsequent state of the game course.

10. The method of claim 1, wherein the estimated time is updated by the game action function as the player traverses the game course based on the performance of the player in completing one or more of the segments.

11. A server system, comprising:
a game course analyzer for receiving game data of a player of a video game for predicting a game course the player is to take between a current state and a subsequent state within the video game;
a game course segmentation module for identifying a plurality of sequential segments that player is to complete by inputting game action inputs to achieve corresponding game responses;
a game play effectiveness module for processing game telemetry of the player of the player from prior segments of the video game for determining effectiveness metrics, the game telemetry includes game action inputs and corresponding game responses;
a game action function module for predicting a duration for completion for the game course based on the plurality of segments of the game course and based on the effectiveness metrics; and
a recommendation module for communicating the duration for completion to a device of the player.

12. The server system of claim 11, wherein the game action function module is configured to apply the effectiveness metrics to each of the plurality of segments to obtain respective estimated times for the players to complete each of the plurality of game segments, the game action function sums the respective estimated times for the player to complete each of the plurality of segments for said predicting the curation for completion.

13. The server system of claim 11, wherein the game action function applies a weighting factor to the respective segments, the weighting factor is indicative of how effective is performing within the video game prior to playing the game course.

14. The server system of claim 11, wherein said processing the game telemetry of the player includes comparing the game action inputs and the corresponding game responses with desired game responses for determining the effectiveness metrics.

15. The server system of claim 11, further comprising:
a user profile module for identifying a user activity associated with a predetermined time of day;
a scheduling manager for determining that the player will not complete the game course before the predetermined time of day associated with the user activity based on a current time and the estimated time, wherein the recommendation module provides an indication that the player will not compete the game course before the user activity that is to occur at the predetermined time of day.

16. The server system of claim 11, wherein the game play effectiveness module is configured to identify a game action input deficiency based on the game action inputs, the corresponding game responses, and desired game responses, and wherein the recommendation module provides, in the recommendation, a tip that enables the player to improve upon the game action input deficiency.

17. The server system of claim 11, wherein the estimated time is updated by the game action function as the player traverses the game course based on performance of the player in completing one or more of the segments.

18. A non-transitory computer-readable storage medium storing a computer program executable by a processor-based system, comprising:
program instructions processing game data of a player of a video game for determining a game course the player is to take between a current state and a subsequent state within the video game;
program instructions for identifying a plurality of segments that are sequential within the game course, each of the plurality of segments is to be completed by the player by inputting game action inputs to achieve corresponding game responses;
program instructions for processing game telemetry of the player from prior segments of the video game for determining effectiveness metrics, the game telemetry includes game action inputs and the corresponding game responses;
program instructions for calculating, using a game action function, an estimated time the player is to use to traverse the game course to reach the subsequent state based on the effectiveness metrics; and
program instructions for generating a recommendation for communication to a device of the player, the recommendation includes the estimated time for the player to reach the subsequent state.

19. The non-transitory computer-readable medium of claim 18, wherein the game action function applies the effectiveness metrics to each of the plurality of segments to obtain respective estimated times for the player to complete each of the plurality of segments, the game action function sums the respective estimated times for said calculating the estimated time the player is to use to traverse the game course.

20. The non-transitory computer-readable medium of claim 18, further comprising:
program instructions for identifying, from the game telemetry, a game action input deficiency based on the game action inputs, the corresponding game responses, and desired game responses;
program instructions providing, in the recommendation, a tip or a resource for correcting the game action input deficiency.

21. The method of claim 1, wherein said calculating the estimated time using the game action function is further based on duration times of other players having similar effectiveness metrics as the player, said duration times of the other players are the duration times of the other players to traverse the game course to reach the subsequent state.

22. The server system of claim 11, wherein the game action function module for predicting the duration for completion is further based on duration times of other players having similar effectiveness metrics as the player, said duration times of the other players are the duration times of the other players for completion of the game course.

23. The non-transitory computer-readable medium of claim 18, wherein said calculating the estimated time using the game action function is further based on duration times of other players having similar effectiveness metrics as the player, said duration times of the other players are the duration times of the other players to traverse the game course to reach the subsequent state.

* * * * *